United States Patent
Mutikainen et al.

(10) Patent No.: US 9,246,706 B2
(45) Date of Patent: Jan. 26, 2016

(54) INTERWORKING BETWEEN MESSAGING SERVICES

(75) Inventors: Jari Mutikainen, Lepsama (FI); Jozsef Varga, Nagydobsza (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 391 days.

(21) Appl. No.: 12/935,051

(22) PCT Filed: Mar. 30, 2009

(86) PCT No.: PCT/EP2009/053744
§ 371 (c)(1),
(2), (4) Date: Dec. 13, 2010

(87) PCT Pub. No.: WO2009/121840
PCT Pub. Date: Oct. 8, 2009

(65) Prior Publication Data
US 2011/0264747 A1 Oct. 27, 2011

(30) Foreign Application Priority Data
Mar. 31, 2008 (EP) ..................... 08153733

(51) Int. Cl.
G06F 15/16 (2006.01)
H04L 12/58 (2006.01)

(52) U.S. Cl.
CPC .......... *H04L 12/581* (2013.01); *H04L 12/5835* (2013.01); *H04L 12/5875* (2013.01); *H04L 51/04* (2013.01); *H04L 51/066* (2013.01); *H04L 51/30* (2013.01); *H04L 12/5895* (2013.01)

(58) Field of Classification Search
CPC ... H40L 12/581; H40L 51/30; H40L 12/5835; H40L 51/066
USPC ........................................................ 709/206
See application file for complete search history.

(56) References Cited

U.S. PATENT DOCUMENTS 5,461,669 A 10/1995 Vilain
5,673,261 A 9/1997 Tjabben et al.
(Continued)

FOREIGN PATENT DOCUMENTS

EP 0697796 A2 2/1996
GB 2439463 12/2007
(Continued)

OTHER PUBLICATIONS

3rd Generation Partnership Project; Technical Specification Group Services and System Aspects; Support of Short Message Service (SMS) over generic 3GPP Internet Protocol (IP) access; Stage 2, (Release 8), 3GPP TS 23.204 V8.0.0., Dec. 2007, a total of 30 pages.
(Continued)

Primary Examiner — Razu A Miah
(74) Attorney, Agent, or Firm — Squire Patton Boggs (US) LLP

(57) ABSTRACT

In a service level interworking unit, a service center (SC) address or a set of SC addresses dedicated for the service level interworking is used whenever an instant message (IM) is interworked to a short message (SM). In other words, if a message is initially sent as an instant message (IM) by user equipment (UE) and is interworked to a short message (SM) by the interworking function, the interworked short message (SM) is sent to a dedicated service center (SC) address. For originating messages that are not interworked, different service center address or addresses are used. A terminating short message (SM) received at the interworking unit is interworked to an instant message (IM) and the interworked instant message (IM) is delivered to the user equipment (UE), if a service center address in the terminating short message (SM) is one of the dedicated service center addresses. If the a service center address in the terminating short message (SM) is not one of the dedicated service center addresses, the terminating short message (SM) is delivered to the user equipment (UE) without a service level interworking.

17 Claims, 3 Drawing Sheets

(56) References Cited

U.S. PATENT DOCUMENTS

| | | | |
|---|---|---|---|
| 6,069,890 A | 5/2000 | White et al. | |
| 6,222,837 B1 | 4/2001 | Ahuja et al. | |
| 6,393,437 B1 | 5/2002 | Zinda et al. | |
| 6,912,402 B1* | 6/2005 | Haumont et al. | 455/519 |
| 7,702,342 B2* | 4/2010 | Duan | 455/466 |
| 8,407,357 B2* | 3/2013 | Oh et al. | 709/230 |
| 8,539,093 B2* | 9/2013 | Forstall et al. | 709/232 |
| 2001/0048738 A1 | 12/2001 | Baniak et al. | |
| 2002/0007453 A1* | 1/2002 | Nemovicher | 713/155 |
| 2003/0154293 A1* | 8/2003 | Zmolek | 709/228 |
| 2004/0019695 A1* | 1/2004 | Fellenstein et al. | 709/239 |
| 2004/0058694 A1* | 3/2004 | Mendiola et al. | 455/466 |
| 2004/0152477 A1* | 8/2004 | Wu | H04L 12/581 455/466 |
| 2005/0021840 A1* | 1/2005 | Niemi | H04L 51/30 709/238 |
| 2005/0204003 A1* | 9/2005 | Vargas et al. | 709/206 |
| 2005/0210113 A1* | 9/2005 | Kasuga | H04L 12/581 709/206 |
| 2005/0213537 A1 | 9/2005 | Ingimundarson et al. | |
| 2006/0212525 A1* | 9/2006 | Atarius et al. | 709/206 |
| 2007/0038740 A1* | 2/2007 | Steeves | 709/224 |
| 2007/0043815 A1* | 2/2007 | Tsang et al. | 709/206 |
| 2007/0239737 A1* | 10/2007 | Dudley et al. | 707/10 |
| 2008/0040437 A1* | 2/2008 | Agarwal et al. | 709/206 |
| 2008/0045234 A1* | 2/2008 | Reed | H04W 8/02 455/456.1 |
| 2008/0130663 A1* | 6/2008 | Fridman et al. | 370/401 |
| 2008/0155026 A1* | 6/2008 | Daniels-Farrar et al. | 709/206 |
| 2008/0281931 A1* | 11/2008 | Oh et al. | 709/206 |
| 2009/0006570 A1* | 1/2009 | Forstall et al. | 709/206 |
| 2009/0055486 A1* | 2/2009 | Chen | 709/206 |
| 2009/0064339 A1* | 3/2009 | Denner et al. | 726/26 |
| 2009/0113007 A1* | 4/2009 | Colon | 709/206 |
| 2009/0125677 A1* | 5/2009 | Leveque et al. | 711/113 |
| 2009/0157816 A1* | 6/2009 | Pattan | 709/206 |
| 2009/0186638 A1* | 7/2009 | Yim | H04L 12/581 455/466 |
| 2009/0197622 A1* | 8/2009 | Atarius | 455/466 |
| 2009/0222525 A1* | 9/2009 | Jayawant Pattan | H04L 12/581 709/206 |
| 2009/0225732 A1* | 9/2009 | Begall | H04W 88/184 370/338 |
| 2009/0325609 A1* | 12/2009 | Rosen | H04L 67/42 455/466 |
| 2010/0205268 A1* | 8/2010 | Zhu et al. | 709/206 |

FOREIGN PATENT DOCUMENTS

| | | |
|---|---|---|
| RU | 2314658 C2 | 1/2008 |
| WO | 97/24885 A1 | 7/1997 |

OTHER PUBLICATIONS

3rd Generation Partnership Project; Technical Specification Group Services and System Aspects; Service Level Interworking for Messaging Services; Stage 2, (Release 8), 3GPP TR 23.811 v1.2.1, Feb. 2008, a total of 37 pages.

Office Action dated May 13, 2014, issued in corresponding Pakistan Application No. 263/2009.

Decision to grant dated Apr. 9, 2012, issued in corresponding Russian Application No. 2010144147/07 (063644), with English translation.

Shiao-Li Tsao et al: "Inter-working and Integration of Messaging Services in a Heterogeneous Wireless Environment"; IEEE; 3 Park Avenue; New York; NY 10016-5997; USA, 2005 (5 pages).

Anahita Gouya et al: "SCIM (Service Capability Interaction Manager) Implementation Issues in IMS Services Architecture"; IEEE; 3 Park Avenue, New York; NY 10016-5997; USA, 2006 (6 pages).

Open Mobile Alliance "Instant Messaging using Simple" Candidate Version 1.0—Aug. 16, 2007, OMA-TS-SIMPLE_IM-V1_0-20070816-C, 188 pages.

3GPP TS 23.040 V7.0.1 (Mar. 2007) "3rd Generation Partnership Project; Technical Specification Group Core Network and Terminals; Technical realization of the Short Message Service (SMS) (Release 7)"; 3rd Generation Partnership Project (3GPP); Mobile Competence Centre; 650, Route des Lucioles; F-06921 Sophia-Antipolis Cedex; France (199 pages).

* cited by examiner

INTERWORKING BETWEEN MESSAGING SERVICES

FIELD OF THE INVENTION

The present invention relates to messaging services, and particularly to a service level interworking between different messaging services.

BACKGROUND OF THE INVENTION

IP Multimedia Subsystem (IMS) is a 3rd Generation Partnership Project (3GPP) standardised network architecture that provides an access network independent standardised interface for creating services, charging mechanisms and better Quality of Service (QoS) than best effort. Examples of the services that may be implemented on IMS are Instant Messaging (IM), IMPS (Instant Messaging and Presence Service), Simple/IM (SIP for Instant Messaging and Presence Leveraging Extensions/Instant Messaging). Instant message is a message delivered to a user in an instant, interactive manner. Generally short, even brief Instant Messages are often called IMs. IMs are often exchanged back-and-forth between users in a conversational fashion. In other words, it is a type of messaging service by which the sender expects immediate message delivery in (near) real time fashion. Instant Messaging using SIMPLE is defined in OMA-TS-SIMPLE_IM-V1_0-20070816-C.

The Short Message Service (SMS) has enjoyed great success in cellular networks. At the same time, specifications have been and are being developed for extending 3GPP services to non-cellular IP Connectivity Access Networks (IP-CANs). 3GPP TS 23.204 specifies how to deliver SMS over generic 3GPP IP access, where the Short Message (SM) is entirely encapsulated in the SIP based messages so that the traditional SM not only can be delivered in Circuit Switched domain (CS), but also in IMS over different IP-CANs. An IP-Short-Message-Gateway (IP-SM-GW) provides the protocol interworking for delivery of the short message between IP-based User Equipment (UE) in IMS and a Service Center (SC). The message is routed to the SC for delivery to the SMS-based user equipment or the message is received from the SC of an SMS-based UE for delivery to an IP-based UE.

However, the interworking between the Short Message and the Instant Messaging has not been defined yet, which prohibits the message interworking between the traditional SMS terminals and the non-SMS capable terminals. 3GPP TR 23.811 V1.2.1 (2008-02) discloses alternatives for how to provide a service level interworking for instance between short message (SM) and existing Instant Messaging (IM) services, which enables the communication between SMS terminals and the terminals that do not support the SMS, such as pure SIP terminals. It is responsible for converting the IM service to SMS and vice versa. It performs the conversion e.g. based on user preference and operator policy, i.e. when the UE is able to use both services, the policy or preference may define which service is used. It may also happen that the UE or the radio access network is capable for one service only, in which case the interworking function may need to perform the conversion to different service. This new interworking to support protocol interworking and translation between SMS and IM Messaging may be implemented in the IP-Short-Message-Gateway (IP-SM-GW).

Both IM and SM services define a delivery report mechanism. When a short message is sent, a service center SC or the recipient UE may send an SM status report or a delivery notification, which confirms the delivery of the short message to the recipient, or it may be a failure report, which informs the originator that the short message was never delivered and the reason why. Similarly, when an instant message is sent, a corresponding delivery notification of the IM service may be sent. When these delivery report messages are received at the service lever interworking function, such as at the IP-SM-GW, these messages are processed as any other message, e.g. they may be converted e.g. based on user preference and operator policy, i.e. when the UE is able to use both services, the policy or preference may define which service is used.

However, different messaging services may be implemented in independent, separate applications in the UE. This means that if the UE sends the actual message via SM service, it expects also the delivery report via that service. The same applies to IM service as well. If the delivery report comes to the UE via different service which was used to send out the actual message, the UE has no means to bind the delivery report to the actual message.

With the current IM-SMS interworking function, it may happen that a message and its delivery notification or status report are sent and received with different services: an SM status report is sent for an instant message (IM), or an IM delivery notification is sent for a submitted short message (SM). Let us study some examples of situations where this could happen. (i) UE sends an instant message (IM) while being registered to the IMS, but deregisters from the IMS before a delivery notification of the IM is sent back, thus the delivery notification is interworked to an SM status report. (ii) UE sends an instant message (IM), which is interworked to a short message (SM) according to operator policy, but the returning status report is not interworked. (iii) A message is sent as a short message (SM) (UE is not registered to the IMS), but the status report is interworked to an IM delivery notification according to user preferences.

Obviously, if an initial message and its delivery notification are handled by different applications in the UE, the UE cannot find the relation between these events. Thus, there is a need for avoiding or alleviating this problem.

BRIEF DESCRIPTION OF THE INVENTION

An object of the present invention is to provide a method and apparatus which alleviate the problem described above. The object of the invention is achieved by means of the invention as claimed in the independent claims. The preferred embodiments of the invention are disclosed in the dependent claims.

According to an aspect of the invention, a method is provided to ensure that the delivery notification (e.g. status report for SMS) for a message is sent using the same service (e.g. IM or SM) as the message was sent. This aspect avoids the problem of "mixing of services" related to the initial message and its delivery report.

According to an embodiment of the invention, a service center address or a set of service center addresses is or are dedicated for a service level interworking. The dedicated service center address or addresses is or are used when an originating message of a first messaging service is interworked to a message of a second messaging service at a service level interworking function. For originating messages that are not interworked to the second messaging service, different service center address or addresses are used. A terminating message of the second messaging service is interworked to a message of the first messaging service and the interworked terminating message is delivered to the user equipment, if a service center address in the terminating message is the dedicated service center address or one of the dedicated service center addresses. If the service center address in the terminating message is not the dedicated service center address or one of the dedicated service center addresses, the terminating message is delivered to the user equipment without interworking to a message of the first messaging service.

According to an aspect of the invention a method is provided which comprises receiving, at a service level interworking function, from originating user equipment an originating message of a first messaging service, interworking the originating message to a message of a second messaging service, or maintaining the originating message as a message of the first messaging service, based on a predetermined criteria, sending the interworked originating message with a service center address selected among one or more service center addresses dedicated for service level interworking, receiving, at the service level interworking function, a terminating message of the second messaging service containing a service center address, interworking the terminating message to a message of the first messaging service and sending the interworked terminating message to the originating user equipment, if the service center address in the terminating message is one of said one or more service center addresses dedicated for service level interworking, and sending the terminating message to the originating user equipment without interworking to a message of the first messaging service otherwise.

According to another aspect of the invention an apparatus is provided which comprises a service level interworking unit configured to send an originating message to a service center address selected among one or more service center addresses dedicated for service level interworking, if the originating message is interworked from a first messaging service to a second messaging service, and wherein said service level interworking unit is further configured to interwork, at the service level interworking function, a received terminating message to a message of the first messaging service, and to send the interworked terminating message to the originating user equipment, if a service center address in the terminating message is one of said one or more service center addresses dedicated for service level interworking.

According to still another aspect of the invention an apparatus is provided which comprises means, at a service level interworking function, for receiving from originating user equipment an originating message of a first messaging service, means for interworking the originating message to a message of a second messaging service, or maintaining the originating message as a message of the first messaging service, based on a predetermined criteria, means for sending the interworked originating message with a service center address selected among one or more service center addresses dedicated for service level interworking, means for receiving, at the service level interworking function, a terminating message of the second messaging service containing a service center address, means for interworking the terminating message to a message of the first messaging service and sending the interworked terminating message to the originating user equipment, if the service center address in the terminating message is one of said one or more service center addresses dedicated for service level interworking, and for sending the terminating message to the originating user equipment without interworking to a message of the first messaging service otherwise.

In an embodiment of the invention, the first messaging service is an instant message service, and the second messaging service is a short message service.

In an embodiment of the invention, the first messaging service is a short message service, and the second messaging service is an instant message service In an embodiment of the invention, the terminating message is a delivery report for the originating message.

In any embodiment of the invention, correlation information for an interworked originating message is be further stored in connection with the interworking.

In an embodiment, when an originating instant message is interworked to a short message, said correlation information comprises at least a Message-ID from the originating instant message and at least a TP-Message-Reference from the interworked short message.

In an embodiment of the invention, the originating message is received via an IP multimedia subsystem (IMS) from IP-based user equipment.

In an embodiment of the invention, the originating message and the interworked terminating message comprises an instant message or a short message encapsulated in a session initiation protocol message.

In an embodiment of the invention, load balancing settings of the dedicated service center addresses are configured to allow changing of a dedicated service center address to another dedicated service center address only, and to allow changing of a non-dedicated service center address to another non-dedicated service center address only.

BRIEF DESCRIPTION OF THE DRAWINGS

In the following the invention will be described in greater detail by means of exemplary embodiments with reference to the attached drawings, in which.

EXEMPLARY EMBODIMENTS OF THE INVENTION

Example embodiments of the present invention will be described using a service-level interworking between the Short Message Service (SMS) and the Instant Message (IM) service as an example of the interworking but the invention is not limited to these messaging services. For example, a service level interworking between the Instant Message (IM) and Multimedia Messaging Service (MMS) may be used. It should also be appreciated the term instant message (IM) service as used herein refers generally to all types of instant messaging, such as IMPS (Instant Messaging and Presence Service), Simple/IM (SIP for Instant Messaging and Presence Leveraging Extensions/Instant Messaging), Instant Messaging using SIMPLE, etc.

In the example embodiments, the 3rd Generation Partnership Project (3GPP) IP Multimedia Subsystem (IMS) network architecture and a legacy mobile communication system, such as GSM, are used as example of the technologies between which the interworking is provided. However, the interworking between different communication technologies relates to a transport level interworking which is not the primary object of the invention. Thus, the communication technologies used on the transport level are not relevant to the primary invention.

Example scenarios of a possible architecture and operation of a service-level interworking between the Short Message and the Instant Messaging are disclosed in 3GPP TR 23.811 V1.2.1 (2008-02) which is incorporated by reference herein. Example of a possible architecture is illustrated in FIG. 1.

Figure 1:
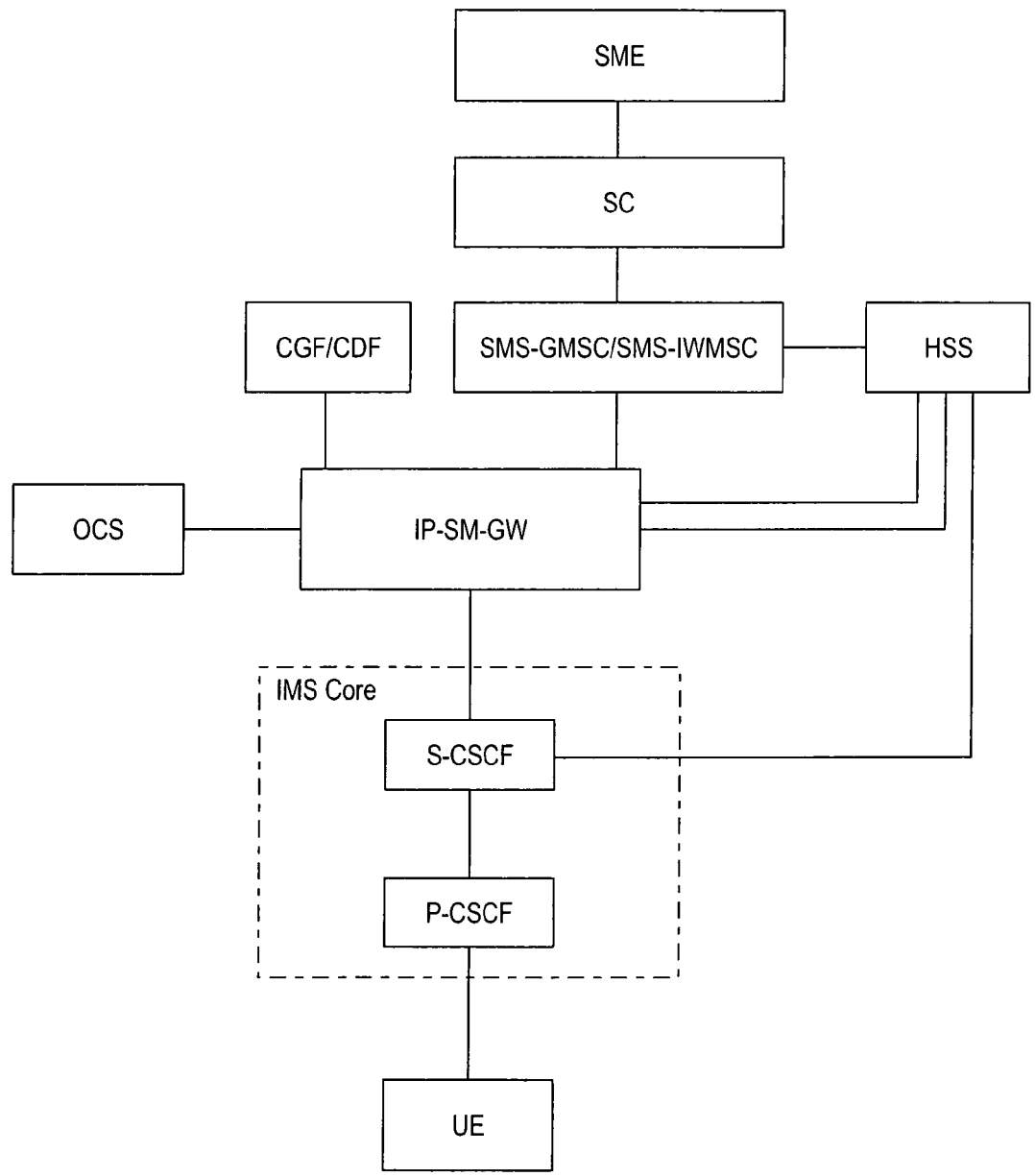
FIG. 1 shows a schematic block diagram illustrating an example of a system architecture wherein a service level interworking according to the invention may be applied.

In the example of FIG. 1, an IP-Short-Message-Gateway (IP-SM-GW) provides the protocol interworking for delivery of the short message between IP-based User Equipment (UE) in an IMS core network and a Service Center (SC). An SMS Gateway Mobile Switching Center (SMS GMSC) or an SMS Interworking MSC (SMS IWMSC) may further be provided between the IP-SM-GW and the SC. The IP-SM-GW may also be connected to the Online Charging System (OCS), the Charging Gateway Function (CGF), and the Home Subscriber Server (HSS). In FIG. 1, the IMS core network contains a Proxy Call Session Control Function (P-CSCF) and a Serving Call Session Control Function (S-CSCF). The P-CSCF is the UE's first contact point within the IMS. Functions of the P-CSCF include the forwarding of SIP messages received from the UE. These may be sent to the S-CSCF or the Interrogating Call Session Control Function (I-CSCF) (not shown) depending on the type of message and procedure being carried out.

An IP-Short-Message-Gateway (IP-SM-GW) provides the protocol interworking for delivery of the short message between IP-based User Equipment (UE) and a Service Center (SC), such as a Short Message Service Center (SMSC). The message is routed to the SC for delivery to the SMS-based user equipment SME, or the message is received from the SC of an SMS-based UE for delivery to an IP-based UE. Additionally, the IP-SM-GW may acquire knowledge of association between MSISDN (Mobile Station International Subscriber Directory Number) and IP (Internet Protocol) addresses of the user equipment. And, the gateway functions to act as an application server towards the IMS (IP Multimedia Subsystem) core.

In case of the IMS originating message, the originating UE sends a SIP MESSAGE (Encapsulated SMS or Instant Message). The originating S-CSCF forwards the SIP MESSAGE to the IP-SM-GW if the user subscribes to at least one of the service level and the transport level interworking services When the IP-SM-GW receives the SIP MESSAGE, it shall decide which interworking should be performed based on the content of the received SIP MESSAGE, as the IP-SM-GW can distinguish between an encapsulated Short Message and an Instant Message. If an encapsulated Short Message is received and if the subscriber is authorized for the service, the IP-SM-GW maps the encapsulated Short Message to a Short Message. Similarly, when an Instant Message is received, the IP-SM-GW considers performing the service-level interworking if the service is authorized: the IP-SM-GW shall decide whether to send the SIP MESSAGE via interworking service based on SIP request header (e.g., R-URI), operator policy, when the Instant Message is not routable in the IMS.

In case of the UE terminating short message, when the IP-SM-GW receives a short message (SM) from the legacy network on the terminating side, it performs the domain selection to determine the preferred domain to transfer the short message. The short message may be delivered over Circuit Switched (CS) or Packet Switched (PS) domain, e.g. when the UE is not registered to the IMS. If the network selected for the delivery is the IMS core, the IP-SM-GW will determine whether the transport level interworking or the service level interworking is to be performed based on the users' subscription and authorization, and based on the UE capability as indicated during IMS registration. If the user has subscribed to both services, is authorized for both and the UE has indicated its capability to receive both encapsulated Short Messages and Instant messages, the priority between the transport-level interworking and the service-level interworking is based on operator policy and user preferences. For example, the IP-SM-GW may convert the SM to an Instant Message and send the IM using the appropriate SIP method towards the S-CSCF.

When the IP-SM-GW receives an UE terminating Instant Message, the IP-SM-GW may, based on user subscription and authorization for service-level interworking, based on operator policy and user preferences, and based on UE capability indicated during IMS registration, deliver the Instant Message to the UE as such or perform service-level interworking to transform the message format to SMS and deliver the message to the UE. If the user is subscribed and authorized for transport-level interworking, and based on UE capability indicated during IMS registration, and based on operator policy and user preferences, the message may be delivered as an encapsulated short message to the UE over the IMS. Otherwise, the short message may be delivered over the CS/PS domain, for example.

Delivery report messages received at the prior art IP-SM-GW are processed as any other UE terminating messages, so that they may be converted based on user preference and operator policy, for example. Thus, when the UE is able to use both services, the policy or preference may define which service is used.

Thus, with the prior art IP-SM-GW, it may happen that a message and its delivery notification or status report are sent and received with different services: an SM status report is sent for an instant message (IM), or an IM delivery notification is sent for a submitted short message (SM).

On the other hand, the messaging services, such as the IM and the SMS may be implemented in independent, separate applications in the UE. This means that if the UE sends the actual message via SM service, it expects also the delivery report via that service. The same applies to IM service as well. If the delivery report is received at the UE via a messaging service different from the messaging service that was used to send out the actual message, the UE has no means to bind the received report to the initially sent message. In other words, if an initial message and its delivery notification are handled by different applications in the UE, the UE cannot find the relation between these events.

According to an aspect of the invention, a method is provided to ensure that the delivery notification (e.g. status report for SMS) for a message is sent using the same service (e.g. IM or SM) as the message was sent. This aspect avoids the problem of "mixing of services" related to the same message.

According to an embodiment of the invention, a dedicated service center (SC) address or a set of SC addresses is used whenever an instant message (IM) is interworked to a short message (SM) at the IP-SM-GW in the originating network. In other words, if a message is initially sent as an instant message (IM) by the UE and interworked to a short message (SM) by the interworking function, the interworked (transformed) short message (SM) is sent to a dedicated service center (SC) address to which non-interworked short messages SM may not be sent. Conversely, the service center SC may send only delivery reports for interworked short messages from one of such dedicated SC addresses. Although it may not be guaranteed that the SC address in the status report will be the same as the SC address in the interworked SM message, they both are from the pool (set) of the SC addresses that are dedicated for the service level interworking. These dedicated SC addresses do not serve the regular users, i.e. the user which do not use the service level interworking.

As a result, a dedicated SC address in the status report will indicate for the IP-SM-GW that the SM for which the status report is received was previously interworked from IM to SM, such the status report cannot be delivered as an SM status report but it must be delivered as a delivery type instant message disposition notification. In an embodiment of the invention, both the IP-SM-GW and the SC may be in the home network of the message sender, so that these special SC addresses can be network specific.

If a message is initially sent as a short message (SM) by the UE, no interworking is performed and the SM message is sent to an SC address configured in the UE. Thus, the SC address in the returning SM status report is not one of the SC addresses that are dedicated for the service level interworking, which will indicate to the IP-SM-GW that the status report is not to be interworked to an instant message (IM) and must be delivered as an SM status report.

In connection with any embodiment of the invention, correlation information for an interworked originating message may be further stored at the interworking unit (e.g. IP-SM-GW). For example, such correlation information may include any information contained in or derivable from the originating IM message prior to the interworking for correlating the originating IM message with a with a related IM delivery notification (a terminating IM message), and it may include any information contained in or derivable from the interworked the originating SM message for correlating the interworked SM message with a with a related SM status report (a terminating SM message). Thus, a received terminating SM status report may be correlated (linked) to a specific originating IM message. Such correlation data may be stored in any suitable data structure, such in a list or table.

In an embodiment of the invention, the correlation information utilized in short messages to correlate the SM status report with the original interworked short message comprises the single-byte TP-Message-Reference.

In an embodiment of the invention, the correlation information utilized in instant messages to correlate the originating IM message and the related IM delivery notification comprises the Message-ID and optionally DateTime.

In an embodiment of the invention, when the originating IM is interworked to SM, the IM Message-ID and optionally DateTime of the originating IM, as well as the TP-Message-Reference of the interworked SM are stored in IP-SM-GW, for example. In an embodiment of the invention, there is stored a list or a table of TP-Message-References and the related IM Message-Ids.

In an embodiment of the invention, for reasons of resilience and/or load sharing architecture of SC's by network operators, the resilience and load balancing settings among SC addresses are configured such a way, that interworking related SC addresses can be changed to interworking related SC address only. In a further embodiment of the invention, the resilience and load balancing settings are configured such that SC addresses not related to interworking can be changed to SC address not related to interworking only.

Figure 2:
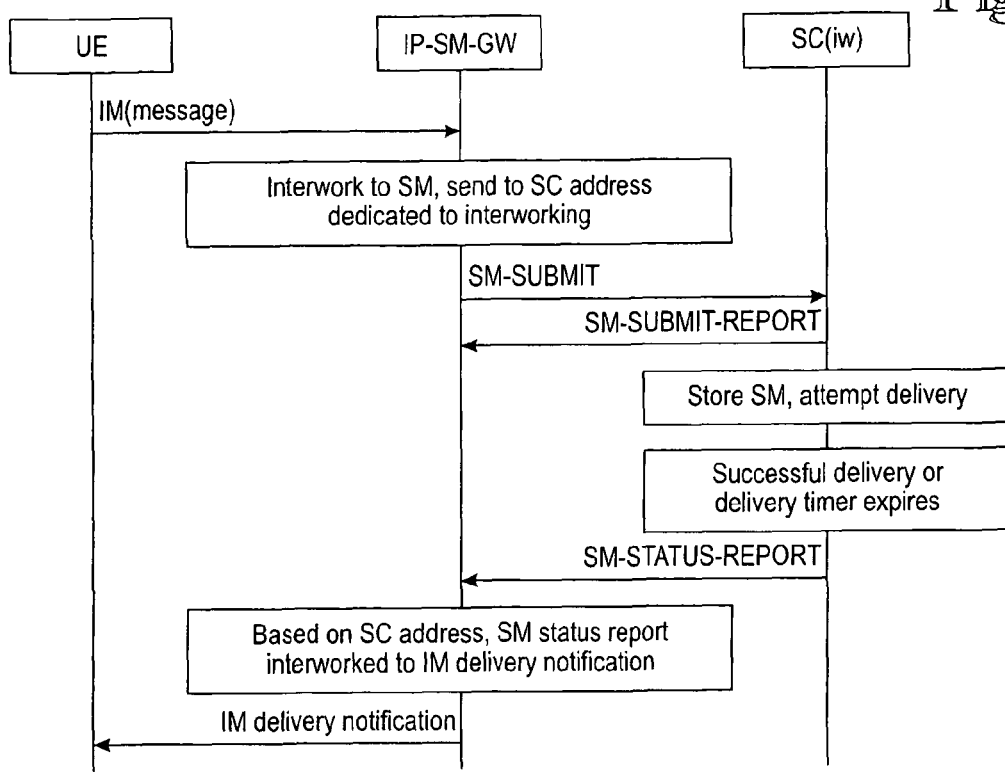
FIG. 2 is a signalling diagram illustrating operation of an interworking function according to an embodiment of the invention, when service level interworking is performed.
Figure 3:
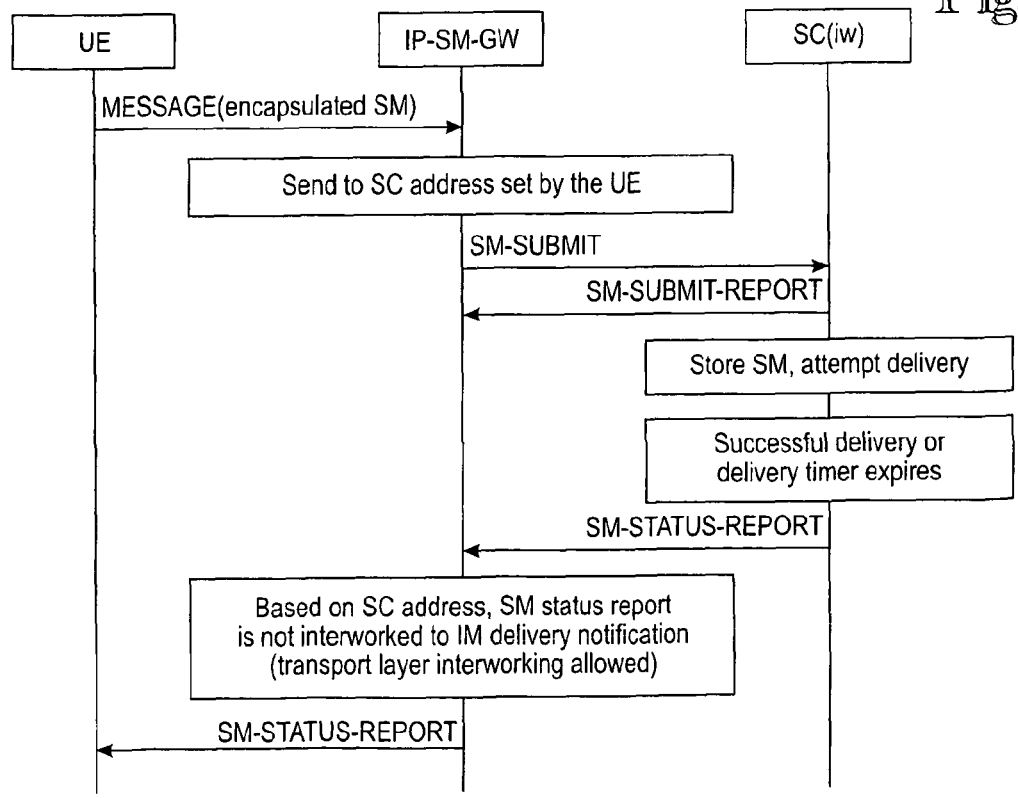
FIG. 3 is a signalling diagram illustrating operation of an interworking function according to an embodiment of the invention, when service level interworking is not performed.
Figure 4:
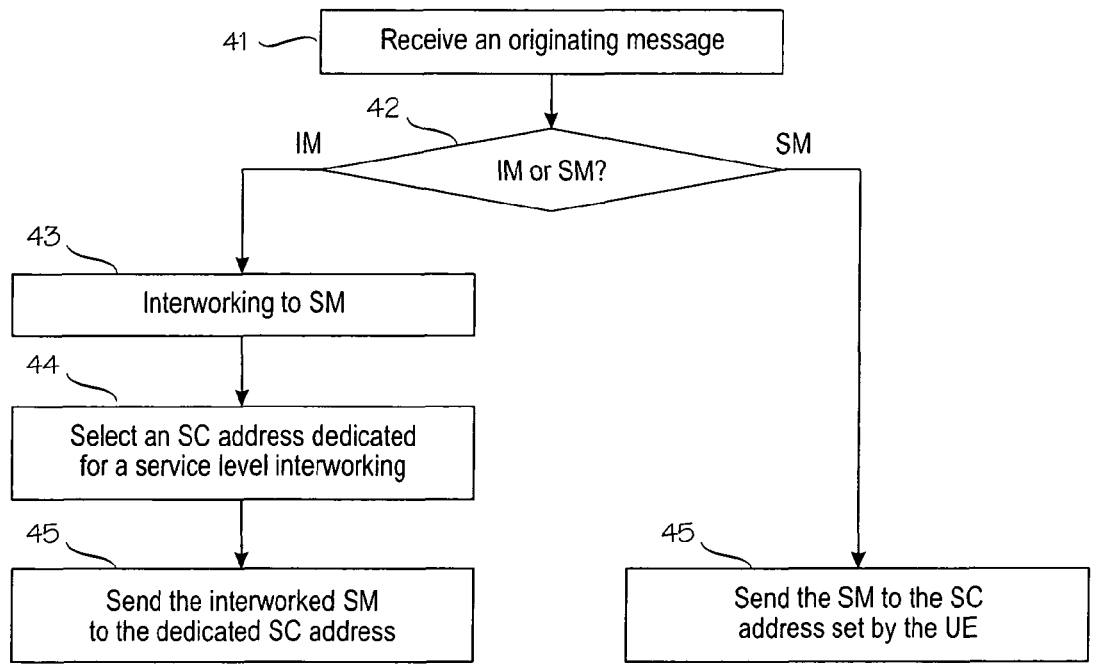
FIG. 4 is a flow diagram illustrating example of operation of the IP-SM-GW for originating messages.
Figure 5:
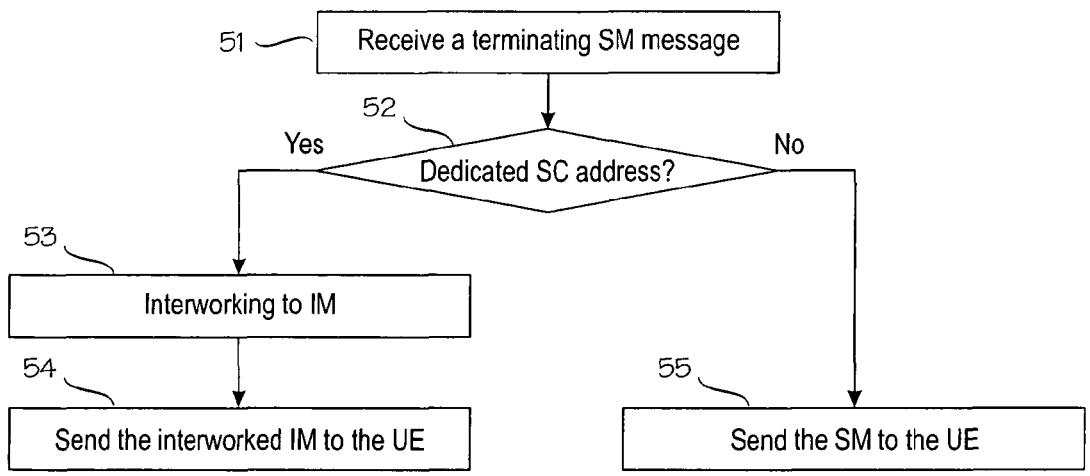
FIG. 5 is flow diagram illustrating example of operation of the IP-SM-GW for terminating messages.

FIGS. 2 and 3 are signalling diagrams illustrating examples of messaging events wherein the service level is performed and not performed, respectively. FIGS. 4 and 5 are flow diagrams illustrating examples of operation of the IP-SM-GW for originating and terminating messages, respectively.

Referring to FIGS. 2 and 4, the originating UE sends an Instant Message (IM). The instant message (IM) is routed (e.g. via an originating S-CSCF) to the IP-SM-GW if the user subscribes to at least one of the service level and the transport level interworking services. When the IP-SM-GW receives the instant message (IM) (steps 41 and 42 in FIG. 4), the IP-SM-GW performs the service-level interworking to transform the instant message (IM) into a short message (SM) (step 43), based on operator policy, user preferences, and UE capability indicated during IMS registration. In an embodiment of the invention, correlation information linking the original IM message and the interworked SM message may be further stored in the IP-SM-GW, as described above. The IP-SM-GW selects a service center (SC) address dedicated for IM-SM interworking (step 44) and submits the interworked message (SM) with the selected dedicated SC address to a service center SC, such as the short message service center SC (step 45). The SC may acknowledge with SM-SUBMIT-REPORT message. The SC may store and attempt to deliver the short message (SM). Upon a successful delivery or an expiry of a delivery timer (i.e. the delivery has not succeeded within a predetermined period of time) the SC may send an SM status report (SM-STATUS-REPORT) with the same dedicated SC address used in the SM-SUBMIT message, or with another SC address from a pool of SC addresses dedicated for the service level interworking. Upon receiving the SM status report (step 51 in FIG. 5), the IP-SM-GW determines that there is a dedicated SC address in the SM status report (step 52). Based on the dedicated SC address, the IP-SM-GW determines that the short message (SM) for which the SM status report is received was previously interworked from an instant message (IM), such the status report cannot be delivered as an SM status report but it must be delivered as a delivery type instant message disposition notification. Consequently, the SM status report is interworked (transformed) by the IP-SM-GW to an instant message delivery notification IM (delivery notification) (step 53). In an embodiment of the invention, the IP-SM-GW may further correlate the TP-Message-Reference of the received SM status report with the correlation information stored in the IP-SM-GW to find the Message-ID and optionally DateTime of the related initial IM message. The found Message-ID and optionally DateTime may be inserted into the IM delivery notification. The IM delivery notification is then delivered to the originating UE over the IMS core (step 54). Now, in the originating UE, the IM delivery notification is received by the same service application as the initial IM message was sent, and therefore the UE is able to determine that the sent IM and the received IM are related to each other.

Referring to FIGS. 3, 4 and 5, the originating UE sends a short message (SM), e.g. encapsulated in a SIP MESSAGE. The short message (SM) is routed (e.g. via an originating S-CSCF) to the IP-SM-GW if the user subscribes to at least one of the service level and the transport level interworking services. When the IP-SM-GW receives the short message (SM) (steps 41 and 42 in FIG. 4), the IP-SM-GW decides to not perform the service-level interworking. Thus, the IP-SM-GW submits the message as a short message (SM) with an SC address set by the UE to a respective service center SC, such as the short message service center SMSC (step 46). The SC address set by the UE does not belong to the pool of dedicated SC addressed according to the invention. Again, the SC may acknowledge with SM-SUBMIT-REPORT message, and store and attempt to deliver the short message (SM). Upon a successful delivery or an expiry of a delivery timer (i.e. the delivery has not succeed within a predetermined period of time) the SC may send an SM status report (SM-STATUS-REPORT) with the SC address used in the SM-SUBMIT message, or with another SC address that does not belong to the pool of SC addresses dedicated for the service level interworking. Upon receiving the SM status report (step 51), the IP-SM-GW determines that there is a non-dedicated SC address in the SM status report (step 52). Based on the SC address, the IP-SM-GW determines that the short message (SM) for which the SM status report is received was not previously interworked from an instant message (IM), such that no service level interworking is needed for the status report either. Instead, the SM status report is delivered to the originating UE over the IMS core (step 55). However, transport layer interworking may be performed. Now, in the originating UE, the SM delivery notification is received by the same service application as the initial SM message was sent, and therefore the UE is able to determine that the sent SM and the received SM are related to each other.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art. The service level interworking function may be implemented in any network element, such as a server. Two or more service level interworking functions may be implemented in a single network element as separate logical entities.

The previous descriptions are of preferred examples for implementing the invention, and the scope of the invention is not intended to be limited by this description. The scope of the present invention is defined by the following claims.

The invention claimed is:

1. A method, comprising
   interworking an originating message from a first messaging service to a second messaging service at a network-based service level interworking gateway,
   storing, at the service level interworking gateway, correlation information particular to an interworked originating message, the correlation information including time information related to the originating message,
   sending, from the service level interworking gateway, the interworked originating message of the second messaging service with a service center address,
   interworking, at the service level interworking gateway, a received terminating message of the second messaging service to an interworked terminating message of the first messaging service by using the correlation information to correlate the received terminating message with the originating message, and
   sending, from the service level interworking function, the interworked terminating message of the first messaging service to the originating user equipment, in order for the interworked terminating message to be delivered to an application present in the originating user equipment which sent the originating message from the first messaging service and not to be delivered to a different application present in the originating user equipment capable of handling messages of the second messaging service.

2. The method according to claim 1, wherein the first messaging service is an instant message service, and the second messaging service is a short message service.

3. The method according to claim 1, wherein the first messaging service is a short message service, and the second messaging service is an instant message service.

4. The method according to claim 1, comprising storing correlation information for an interworked originating message is stored in connection with the interworking.

5. The method according to claim 4, wherein, when an originating instant message is interworked to a short message, said correlation information comprises at least a Message-ID from the originating instant message and at least a TP-Message-Reference from the interworked short message.

6. The method according to claim 1, wherein the terminating message is a delivery report for the originating message.

7. The method according to claim 1, comprising receiving the originating message via an IP multimedia subsystem (IMS) from IP-based user equipment.

8. The method according to claim 1, wherein the originating message and the interworked terminating message comprise an instant message or a short message encapsulated in a session initiation protocol message.

9. The method according to claim 1, comprising
   configuring load balancing settings of the dedicated service center addresses to allow changing of a dedicated service center address to another dedicated service center address only, and to allow changing of a non-dedicated service center address to another non-dedicated service center address only.

10. A gateway apparatus, comprising
   a processor;
   a memory storing machine readable instructions;
   a receiver configured to receive an originating message of a first messaging service from originating user equipment,
   the processor configured to transform the originating message to a message of a second messaging service,
   the memory configured to store correlation information particular to an interworked originating message at a service level interworking gateway, the correlation information including time information related to the originating message; and
   a transmitter configured to send the interworked originating message with a service center address,
   the receiver configured to receive a terminating message of the second messaging service,
   the processor being further configured to transform the terminating message to an interwoked terminating message of the first messaging service by using the correlation information to correlate the received terminating message with the originating message and to send the interworked terminating message of the first messaging service to the originating user equipment in order for the interworked terminating message to be delivered to an application present in the originating user equipment which sent the originating message from the first messaging service and not to be delivered to a different application present in the originating user equipment capable of handling messages of the second messaging service.

11. The gateway apparatus according to claim 10, wherein the first messaging service is an instant message service, and the second messaging service is a short message service.

12. The gateway apparatus according to claim 10, wherein the first messaging service is a short message service, and the second messaging service is an instant message service.

13. The gateway apparatus according to claim 10, wherein, when an originating instant message is interworked to a short message, said correlation information comprises at least a Message-ID from the originating instant message and at least a TP-Message-Reference from the interworked short message.

14. The gateway apparatus according to claim 10, wherein the terminating message is a delivery report for the originating message.

15. The gateway apparatus according to claim 10, wherein the apparatus is configured to receive the originating message via an IP multimedia subsystem (IMS) from IP-based user equipment.

16. The gateway apparatus according to claim 10, wherein the originating message and the interworked terminating message comprises an instant message or a short message encapsulated in a session initiation protocol message.

17. A computer program product stored on a non-transitory computer readable medium and comprising executable code which, when executed in a computing device, performs the following:
  interworking an originating message from a first messaging service to a second messaging service at a network-based service level interworking gateway,
  storing, at the service level interworking gateway, correlation information particular to an interworked originating message, the correlation information including time information related to the originating message,
  sending, from the service level interworking gateway, the interworked originating message of the second messaging service with a service center address,
  interworking, at the service level interworking gateway, a received terminating message of the second messaging service to an interworked terminating message of the first messaging service by using the correlation information to correlate the received terminating message with the originating message, and
  sending, from the service level interworking function, the interworked terminating message of the first messaging service to the originating user equipment, in order for the interworked terminating message to be delivered to an application present in the originating user equipment which sent the originating message from the first messaging service and not to be delivered to a different application present in the originating user equipment capable of handling messages of the second messaging service.

\* \* \* \* \*